Feb. 27, 1968  T. GARCIA ET AL  3,370,519
METHOD AND MEANS FOR REMOVING AN OPAQUE FILM OF ATMOSPHERIC
PARTICLES FROM BEFORE THE LENS OF A CAMERA
Filed June 29, 1965  2 Sheets-Sheet 1

INVENTORS.
THOMAS GARCIA
LYMAN G. VANCE, JR.
LAWRENCE H. MASCHHOFF
BY

*P. H. Fisht*

ATTORNEY.

Feb. 27, 1968     T. GARCIA ET AL     3,370,519
METHOD AND MEANS FOR REMOVING AN OPAQUE FILM OF ATMOSPHERIC
PARTICLES FROM BEFORE THE LENS OF A CAMERA
Filed June 29, 1965     2 Sheets-Sheet 2

INVENTORS.
THOMAS GARCIA
LYMAN G. VANCE, JR.
LAWRENCE H. MASCHHOFF
BY

*P. H. Fisht*

ATTORNEY.

United States Patent Office 3,370,519
Patented Feb. 27, 1968

3,370,519
METHOD AND MEANS FOR REMOVING AN OPAQUE FILM OF ATMOSPHERIC PARTICLES FROM BEFORE THE LENS OF A CAMERA
Thomas Garcia, Lyman G. Vance, Jr., and Lawrence H. Maschhoff, China Lake, Calif., assignors to the United States of America as represented by the Secretary of the Navy.
Filed June 29, 1965, Ser. No. 468,178
2 Claims. (Cl. 95—11)

ABSTRACT OF THE DISCLOSURE

A protective cover for the lens of a camera which is mounted within a rocket test chamber. It consists of a strip of transparent, heat resistant strip suspended across the viewport for the lens and held in place by a take-up spool and a feed spool thereby sealing the port against smoke and debris. The take-up spool is drive in unison with the camera at a preselected speed so that any debris deposited on the strip is removed from the viewport as the take-up spool is driven.

Figure 1:
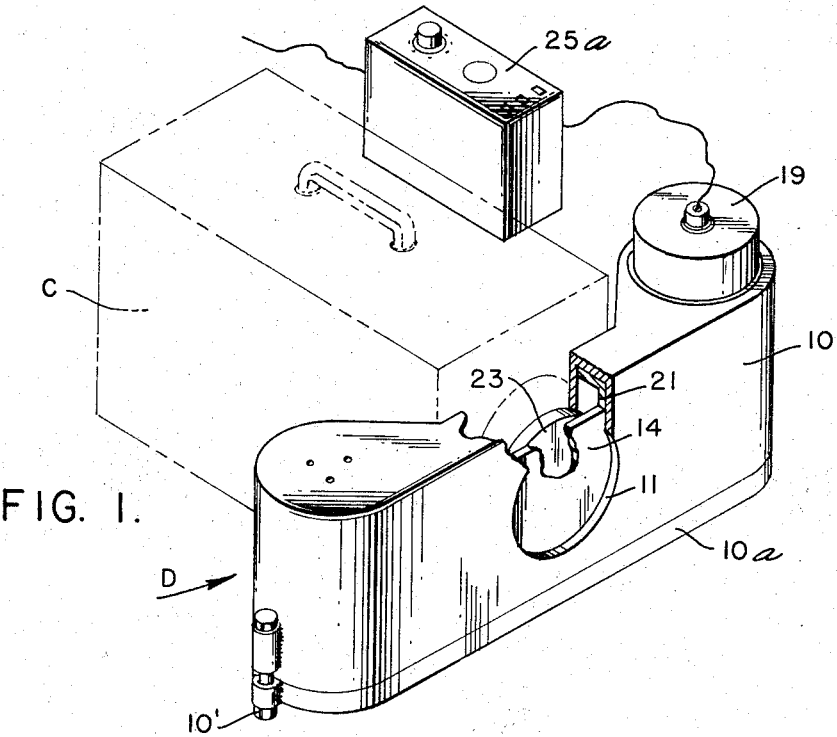

The invention described herein may be manufactured and used by or for the Government of the United States America for governmental purposes without the payment of any royalties thereon or therefor.

The instant invention relates generally to film-removal methods and devices employed in extreme environments and more particularly to an improved method and device for continuously removing a film of by-products of combustion and the like as it is deposited before a view-port provided for the lens of a camera, as utilized in obtaining photographic coverage of test-firing operations performed for rocket motors mounted within hermetically sealed test chambers.

In perfecting rocket motors it is often desirable to obtain photographic coverage of a test-firing sequence. Frequently, a rocket motor to be test-fired is mounted within a vacuumized test chamber, in order to simulate conditions found at extreme altitudes, and subsequently fired with the motor's exhaust being confined, at least initially, within the test chamber. As pointed out in copending application Ser. No. 410,038, filed Nov. 9, 1964, now Patent No. 3,289,557, photographic coverage of such operations has been deemed a difficult task as by-products of combustion, including dense smoke and flying debris, rapidly fill the test chamber and are rapidly deposited on all surface areas with which the by-products come into contact. The thus deposited by-products of combustion form an opaque film which tends to obscure the subject and thus render associated cameras ineffective in obtaining photographic coverage of the test-firing sequence.

The device disclosed in the aforementioned copending application is of a very rugged construction and functions quite satisfactorily under most operative test conditions. However, certain limitations have been realized, among which are the initial expense of the device and the expense encountered in preparing the device for re-use, as well as the built-in limitation in operative efficiency under test conditions of varying duration, particularly where the duration of a test-firing is to be prolonged for a period extending beyond that for which the device was designed.

In practice, it has been found that not all test-firing operations, as performed for many rocket motors, require the ruggedness of the device described in the aforementioned copending application, and that a more versatile and economic device is needed to serve as a complementary device for the device of the copending application.

It is therefore the purpose of the present invention to provide an improved method and a versatile, efficient and economic film removal device for obviating an occurrence of film deposits in hermetically sealed, rocket-motor test chambers, particularly those of the types from which atmospheric air must be evacuated preparatory to the test-firing of a rocket motor therewithin, in order to afford an unobstructed photographic coverage of a sequence of events occurring within the chamber throughout a given test-firing operation.

An object of the present invention is to provide an improved method for removing a deposited film of by-products of combustion from before a camera lens during a rocket motor test-firing operation.

Another object of the instant invention is to provide a versatile, economic, and efficient device for enhancing the effectiveness of photographic systems employed in obtaining photographic coverage of rocket motor test-firing operations, as performed under conditions wherein a thick opaque film of by-products of rocket-motor combustion is caused to be rapidly deposited on adjacent surfaces during the test-firing operation.

Still another object is to provide a film removal device for removing deposited films of by-products of combustion formed before the lens of camera systems employed in obtaining photographic coverage of rocket motor test-firing operations performed in an initially air-evacuated and hermetically sealed test chamber.

A further object is to provide an improved, simple, lightweight and portable device which may be employed for preventing an occurrence of a deposit of atmospheric particles before the lens of photographic devices.

Figure 3:
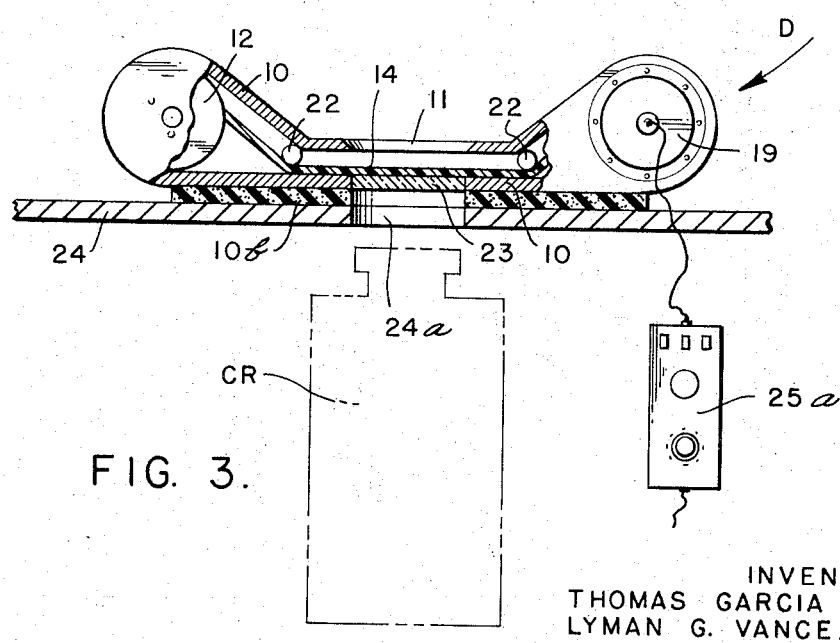
Figure 2:
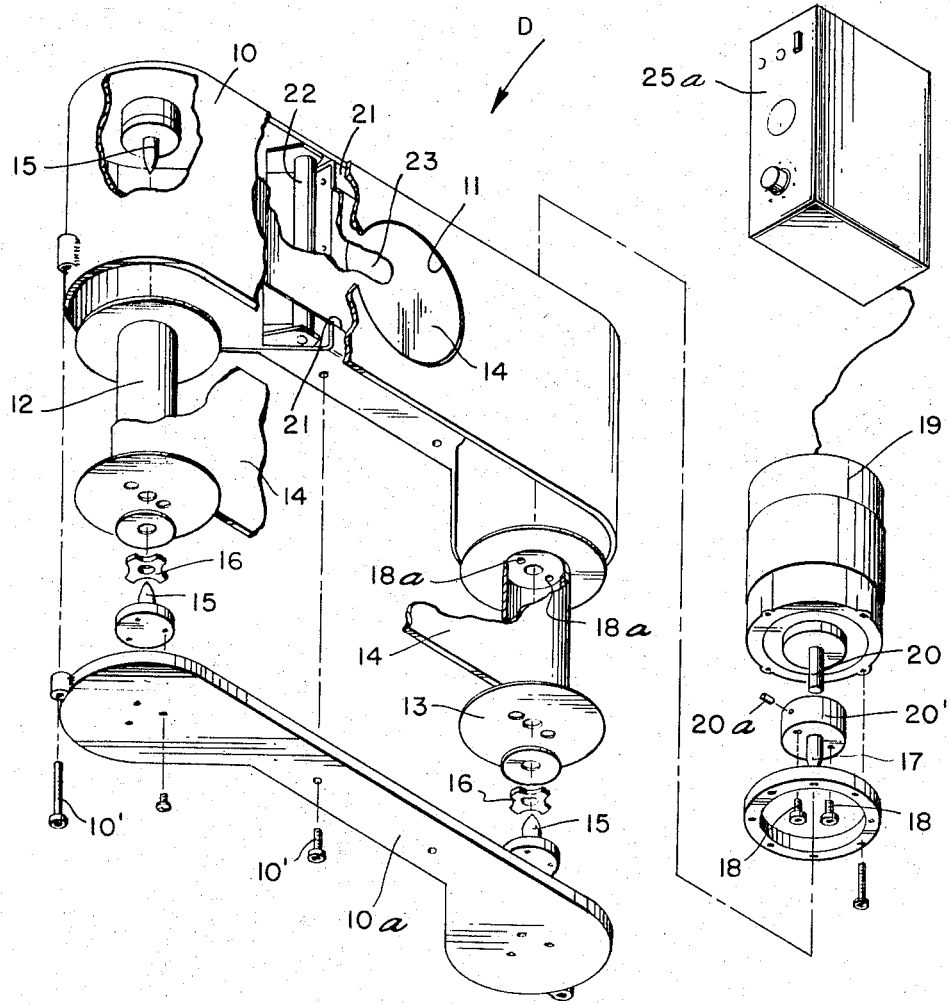
Figure 4:
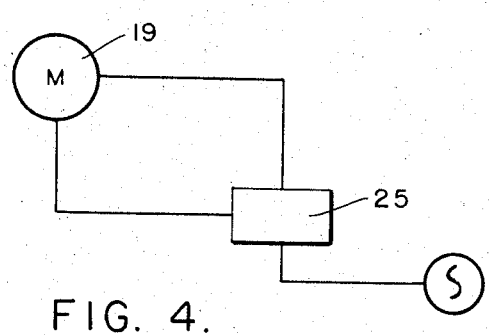

Other object, advantages and novel features of the invention will become apparent from the following detailed description of the invention when considered in conjunction with the accompanying drawings wherein:

FIG. 1 comprises a perspective view of one embodiment of the device of the instant invention, and further serves to illustrate one manner in which the device of the instant invention may be operatively mounted;

FIG. 2 comprises an exploded view of the device of FIG. 1;

FIG. 3 comprises a partial plan view of a modification of the device of FIGS. 1 and 2, and further serves to illustrate another manner in which the device may be operatively mounted; and FIG. 4 comprises a block diagram of an electrical system as provided for the device of the instant invention.

Turning now to the drawings, wherein like reference characters designate like or corresponding parts throughout the several views, there is shown in FIG. 1 an over-all partially sectioned, perspective view of one modification of the device D of the instant invention. As shown, FIG. 1, the device D may be mounted on a portable, camera-bearing, shock-proof camera case C, which normally includes a port, often called a view-port, through which the lens of an associated camera may be directed, in order for the device D to be coupled directly with a portable camera for use as a portable unit, which may be mounted within a rocket motor test chamber in a manner more fully described in the aforementioned copending application. However, where the device D is to be coupled with a camera-bearing case and mounted within a test chamber, near the rocket motor's exhaust, it is deemed advisable to provide a coating of a heat-resistant rubber compound, not shown, about the unit in order to protect the camera mounted therein, in a manner as also described in the aforementioned copending application.

The device D includes a case 10 formed of any suitable lightweight, heat resistant material, such as a thin gauge stainless steel sheet material, for example. Access to the interior portion of the case 10 is provided for through a cover-plate 10a which extends the full length of one side of the case 10 and is secured thereto in any suitable manner, such as by screws 10', for example. It is to be particularly noted that two opposite sides of the case 10 are provided with a flat surface area through which extends a port 11. This port is, in practice, employed as a view-port for a lens of a selected camera arranged in coaxial alignment therewith. The surface areas surrounding the opposite ends of the port 11 serve as surfaces for mounting the device D. Further a flexible sealing member 10b may be employed for providing a necessary hermetic seal between the case 10 and its support means. Therefore it is to be understood that the case 10 may be mounted adjacent a camera in a manner such that it may be supported by means disposed at either of its opposite sides, FIGS. 1 and 3. Various mounting means may be employed in mounting the device. Such means normally include, for example, clamps, screws, spring-loaded brackets and the like, not designated, fixed to the case 10.

Mounted for rotation within the case 10, at the opposite ends thereof, is a pair of spools 12 and 13, FIG. 2, having suspended therebetween a flexible, transparent strip 14 of heat resistant material, such as Mylar, for example. While either spool may be employed as a feed spool, about which a supply of the strip 14 is wound, with the other spool being employed as a driven take-up spool, which serves to operatively withdraw the strip 14 from the feed spool, spool 12 is designated a feed spool, while spool 13 is designated a take-up spool.

The feed spool 12 is mounted for rotation about its longitudinal axis through a pair of idle pins 15 fixed to the case 10 and the cover plate 10a by suitable means not designated. The pins 15 serve to support the spool for free-running rotation. However, since it is desirable to prevent an over-feeding of the strip 14, a pair of conventional constant-friction disk-shaped fabric members 16 is mounted about the pins 15 in a manner such that a restraining friction or drag is constantly applied to the spool 12 as it is caused to be rotated in the feeding of the strip 14.

The take-up spool 13 is mounted in a manner similar to that of the feed spool 12, FIG. 2. However, since it is to be necessary to drive the take-up spool 13 in a strip feeding mode, viz, impart a rate of rotation thereto, it is necessary that coupling means be employed for coupling the spool 13 to a suitable rotatable drive means of a type capable of imparting a selected rate of rotation to the spool 13. The coupling means presently employed comprises a pin 17 disposed to extend along the spool's longitudinal axis and is fixed to one end thereof by screws 18 threaded through openings 18a formed in an end portion of the spool 13. The pin 17, in turn, is coupled with a drive means, including a motor 19, through a spline-shaft 20 and collar 20'. The spline-shaft is operatively inserted into the collar 20' and is secured therein by a set-screw 20a. If desired, the collar 20' may be formed as an integral portion of the pin 17.

The drive means 19 comprises a variable-speed D.C. (direct current) motor having high starting torque characteristics. Such motors are of well-known design, therefore a detailed description thereof is omitted in the interest of brevity. However, it will be appreciated that the motor 19 must be "matched," in a conventional manner, with the load to be operatively imposed thereon, in order that the take-up spool 13 may be driven at various rates for imparting a selected rate of longitudinal displacement to the strip 14 as the strip caused to be unrolled or drawn from the feed spool 12 by the take-up spool 13.

The strip 14 is fed from the spool 12 between elongated guide surfaces 21, FIG. 2, aligned in parallel relationship with, and at equal distances from a longitudinal axis which extends between the ends of the case 10 to bisect the axis of rotation of each of the spools 12 and 13. The surfaces 21 are polished, in order to reduce friction, and are aligned at opposite sides of the port 11 so that the strip 14 may be caused to rapidly traverse the port 11 as it is fed between the spools 12 and 13. A pair of elongated guide rollers 22, only one of which is shown in FIG. 2, is rotatably mounted within the case 10. The rollers 22 are disposed and aligned at opposite ends of the pair of guide surfaces 21 and aid in feeding the strip 14 therethrough in a substantially friction-free manner.

As more clearly shown in FIG. 3, a transparent, plane-surfaced fuzed quartz disk 23 is fixed in transverse alignment across one end on the port 11 and is sealed within one wall of the case 10 by any suitable means, not shown, in a manner such that the strip 14 will be disposed between the disk and the atmosphere operatively established within an operative test chamber so that the strip will be caused to slidingly engage a plane surface of the disk as it is fed between the guide surfaces 21. It will be appreciated that as an overpressure is established within the test chamber, upon the firing of a rocket motor, the strip 14 will be forced into a "snug" engagement with the surface of the disk 23, consequently, all atmosphere will be excluded from therebetween.

Where the device D is to be mounted or directly coupled with a camera case C, in the manner shown in FIG. 1, the guide means or surfaces 21, guide rollers 22, and the disk 23 will be aligned for feeding the strip 14 along a first side portion of the case 10, while in instances where the device is to be mounted on a wall 24 of a test chamber, with an external camera CR being mounted outside the test chamber and directed through a port 24a formed therein, the surfaces 21, rollers 22 and disk 23 will be aligned for feeding the strip 14 along the opposite side portion of the case 10, in order to utilize the pressure established in the test chamber for forcing the strip 14 against the surface of the disk 23.

Operation of the motor 19 is controlled through a selectively operable silicon controlled rectifier circuit 25, FIG. 4, including a feed-back circuit, of known design, housed in a suitable housing 25a. The function of the circuit 25 is to permit the use of an A.C. (alternating current) source of power and to accommodate selectivity and control in motor speeds for the variable-speed motor 19. This affords a selective control over the rate at which the take-up spool 13 will be operatively rotated and the rate at which the strip 14 will be caused to traverse the port 11.

It also will be appreciated that various designs may be employed for the circuit 25, however, it is necessary that the circuit employed include rapid response characteristics and be capable of imposing selective control over the rate at which motor 19 is driven. This is important due to the fact that during the initial stages of the test-firing operation, as performed for a selected rocket motor, maximum smoke and debris will be present within the test chamber. This necessarily requires that the strip 14 be displaced at a maximum rate during the early stages of the test-firing operation to thus prevent a build-up of a resulting film before the lens of the camera. However, shortly after the firing of the rocket motor the density of existing smoke and debris will tend to decrease, hence the rate of strip-displacement, for the strip 14, may be reduced to conserve the supply thereof present on the spool 12. For example, where it has been found desirable to feed the strip 14 at a rate of ten feet/second, during the first five-to-ten second period of the test-firing operation, the rate of displacement has been successfully reduced to two feet/second for the duration of the test-firing operation.

It is to be understood that no seals are employed for sealing the port 11 from the remainder of the interior portions of the case 10. Therefore, effects of otherwise present retarding friction is significantly reduced as the strip 14 is caused to traverse the port 11 in a substantially unobstructed manner. The power requirements for driving the strip 14 may, therefore, be maintained at a minimum level. Furthermore, the ruggedness of the case 10 may be minimized, since the pressure to be established within the test chamber will necessarily be established within the case 10 so that pressure differentials therebetween may be avoided, due to the fact that the test chamber and the interior portions of the case 10 communicate through the port 11. The capability of achieving pressure equalization, between the interior of the case and the test chamber, results in substantial savings in construction and maintenance costs. While not fully understood, it has, in practice, been found that although substantially all portions of the test chamber, even the pressure-sealed light fixtures normally located within a test chamber, are subject to smoke penetration and entrapment, no smoke appears to enter that porion of the case 10 which houses the spool 12 and, furthermore, the strip 14 appears to suffer no deleterious effects due to smoke penetration and entrapment, consequently the device D will serve its purpose even though no hermetic seals are employed for sealing the port 11.

Operation of the device D, assembled and mounted in the manner aforedescribed, may be summarized as follows: At the instant the rocket motor to be tested is fired, the circuit 25 is caused to be energized for rotatably driving the take-up spool 13 at a preselected rate, whereby the strip 14 is caused to be drawn from the spool 12 and caused to traverse the port 11 at a selected rate as it is drawn through the guide surfaces 21. As the strip 14 passes through or traverses the port 11, smoke and flying debris are deposited on the surface of the strip thus forming an opaque film of smoke and debris before the disk 23. Since the over-pressure operatively established within the test chamber necessarily acts against the strip 14, the strip 14 is forced against the disk 23 in a manner such that no smoke or debris may penetrate or be trapped therebetween as the strip 14 is drawn thereacross. Due to the fact that the strip 14 is rapidly displaced in a continuous manner, the film being deposited thereon is continuously removed at a rate sufficient for preventing a blocking of the associated camera's view. At a point in time when rocket motor-generation of smoke, debris, and other by-products of combustion subsides, the rate at which the motor 19 is being driven may be substantially reduced so that the strip 14 may be displaced at a suitable rate for removing film being deposited thereon, while yet conserving the supply of the strip 14. It is to be noted that the penetration effects of flying debris and heat present within the chamber will, in practice, be minimized due to the fact that the strip is being displaced at a relatively high rate across the port 11. For example, it has been found that under operative conditions, a Mylar strip, having a thickness of .075-inch and displaced at a rate ranging between 10 and 2 feet/second is sufficient for withstanding the conditions present within a test chamber where the rocket motor being tested was of a relatively large motor size.

In view of the foregoing, it will be appreciated that the instant invention provides an improved, practical solution to problems introduced through smoke and debris inherently present in the field of photographing extended rocket motor firing operations.

Obviously many modifications and variations of the present invention are possible in the light of the above teachings. It is therefore to be understood that within the scope of the appended claims the invention may be practiced otherwise than as specifically described.

What is claimed is:
1. In a camera system of a type to be employed for photographing a continuous sequence of events occurring within a heated and positively pressurized extreme ambient atmosphere having suspended therein opaque film-forming particles, film removal means comprising:
   a case formed of a light-weight, noncorrosive material having at least one external surface area including means adapted for mounting said surface area in sealed relationship with a viewport for a selected camera through which the lens of the selected camera may be directed;
   a port extending from a first end, located at said one surface area, through said case and terminating at a second end, opened to ambient atmosphere, through which the lens of the selected camera may be directed;
   a driven take-up spool mounted for rotation about a first axis of rotation and disposed within said case at one side of said port;
   a variable-speed spool drive means coupled in driving relationship with said driven take-up spool adapted to impart a predetermined variable rate of rotation to said driven take-up spool;
   a free-running feed spool including a constant-friction, rotation-retarding means mounted about an axis of rotation extending parallel said first axis of rotation and disposed within said case at a second side of said port opposite said first side;
   a transparent, plane-surfaced, fuzed quartz disk sealed in transverse relationship with said port and extending across the first end of said port and having a plane surface aligned within said case in a transverse plane extending between said first and second sides of said port;
   means defining low-friction guide means mounted within said case and including a spaced pair of elongated guide surfaces disposed adjacent the plane surface of said disk and aligned at opposite sides of said port in parallel relationship with a longitudinal axis aligned in bisecting alignment with the first and second axis of rotation of said spools;
   an elongated strip of transparent, flexible, heat resistant material connected with said take-up spool, aligned across said port in engagement with said plane surface, wound about the feed spool, and adapted to be drawn by said take-up spool through said guide means across the plane surface of the disk as the take-up spool is caused to be driven at a predetermined rate by said drive means; and
   a selectively operable speed-control device connected with said drive means adapted to be selectively activated for controlling the driving rate of the drive means, whereby the rate at which the drive means is caused to rotate said take-up spool may be selectively varied for drawing said strip across said disk at an optimum rate.

2. The system of claim 1 further characterized in that said drive means comprises a direct current motor possessing high-starting-torque characteristics.

References Cited
UNITED STATES PATENTS

| | | | |
|---|---|---|---|
| 2,506,863 | 5/1950 | Fassin | 95—11 |
| 2,540,351 | 2/1951 | Rundell | 95—11 |
| 2,878,716 | 3/1959 | Leonard | 350—319 X |
| 3,289,557 | 12/1966 | Garcia et al. | 95—11 |

NORTON ANSHER, *Primary Examiner.*

JOHN M. HORAN, *Examiner.*

F. L. BRAUN, *Assistant Examiner.*